(12) United States Patent
Jung et al.

(10) Patent No.: US 12,548,633 B2
(45) Date of Patent: Feb. 10, 2026

(54) METHOD OF TESTING STORAGE CONTROLLER INCLUDED IN STORAGE DEVICE

(71) Applicant: SAMSUNG ELECTRONICS CO., LTD., Suwon-si (KR)

(72) Inventors: Jongyeong Jung, Suwon-si (KR); Seung-Chun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 18/201,888

(22) Filed: May 25, 2023

(65) Prior Publication Data

US 2024/0153575 A1 May 9, 2024

(30) Foreign Application Priority Data

Nov. 7, 2022 (KR) ........................ 10-2022-0147341

(51) Int. Cl.
*G11C 29/36* (2006.01)
*G11C 29/12* (2006.01)
*G11C 29/38* (2006.01)

(52) U.S. Cl.
CPC .......... *G11C 29/36* (2013.01); *G11C 29/1201* (2013.01); *G11C 29/38* (2013.01)

(58) Field of Classification Search
CPC ..... G11C 29/36; G11C 29/1201; G11C 29/38; G11C 29/16; G11C 29/56; G06F 11/2205; G06F 3/0658; G06F 3/0659; G06F 11/2273; G06F 11/26
See application file for complete search history.

(56) References Cited

U.S. PATENT DOCUMENTS

| 6,701,470 | B1* | 3/2004 | Mullarkey | ............. | G11C 29/48 |
| | | | | | 714/719 |
| 7,657,803 | B2 | 2/2010 | Chae | | |
| 8,035,407 | B2 | 10/2011 | Jarboe, Jr. et al. | | |
| 8,489,376 | B2 | 7/2013 | Schaub et al. | | |
| 10,204,025 | B2 | 2/2019 | Pappu | | |
| 11,264,113 | B2 | 3/2022 | Hur et al. | | |
| 11,657,892 | B1* | 5/2023 | Irby | ....................... | G11C 29/76 |
| | | | | | 365/201 |
| 2008/0015798 | A1* | 1/2008 | Bullock | ........... | G01R 31/31718 |
| | | | | | 702/57 |
| 2011/0066903 | A1* | 3/2011 | Foster, Sr. | .............. | G06F 1/206 |
| | | | | | 714/E11.169 |
| 2014/0258780 | A1* | 9/2014 | Eyres | ................. | G11C 29/4401 |
| | | | | | 714/30 |
| 2015/0293173 | A1* | 10/2015 | Tsuboi | .................... | G06F 11/08 |
| | | | | | 714/727 |
| 2020/0118641 | A1 | 4/2020 | Yang | | |
| 2021/0057035 | A1* | 2/2021 | Hur | .................. | G11C 11/40607 |

* cited by examiner

*Primary Examiner* — Jerome Leboeuf
(74) *Attorney, Agent, or Firm* — Muir Patent Law, PLLC (57) ABSTRACT

A method of testing a storage controller included in a storage device may include supplying power to the storage device, transmitting a write command including an algorithm pattern corresponding to a designated special function register of the storage controller, transmitting a read command corresponding to the designated special function register, receiving a chip ID response corresponding to the read command, and determining whether the storage controller is defective based on the chip ID response.

20 Claims, 9 Drawing Sheets

METHOD OF TESTING STORAGE CONTROLLER INCLUDED IN STORAGE DEVICE

CROSS-REFERENCE TO RELATED APPLICATIONS

Korean Patent Application No. 10-2022-0147341, filed on Nov. 7, 2022, in the Korean Intellectual Property Office, is incorporated by reference herein in its entirety.

BACKGROUND

1. Field

Embodiments of the present disclosure relate to a method for testing a storage controller, and more particularly, relate to a method for testing a storage controller included in a storage device using a test equipment not including a vector memory.

2. Description of the Related Art

Semiconductor memory devices may be generally classified into a volatile semiconductor memory device and a nonvolatile semiconductor memory device. The volatile semiconductor memory device is fast in read and write speeds but loses data stored therein when power is not supplied thereto. In contrast, even though power is interrupted, information stored in the nonvolatile semiconductor memory device does not disappear. For this reason, the nonvolatile semiconductor memory device is used to store information that has to be retained regardless of whether power is supplied thereto.

SUMMARY

Embodiments are directed to a method of testing a storage controller included in a storage device. The method may include supplying power to the storage device, transmitting a write command including an algorithm pattern corresponding to a designated special function register of the storage controller, transmitting a read command corresponding to the designated special function register, receiving a chip ID response corresponding to the read command, and determining whether the storage controller is defective based on the chip ID response.

Embodiments are also directed to a method of testing a storage controller included in a storage device. The method may include receiving power from a test equipment, performing a ROM initialization, receiving a write command including an algorithm pattern corresponding to a designated special function register of the storage controller, performing a write operation on the designated special function register based on the write command, receiving a read command corresponding to the designated special function register, performing a read operation on the designated special function register based on the read command, and transmitting a chip ID response corresponding to the read command.

Embodiments are also directed to a method of testing a storage controller included in a storage device. The method may include supplying power from a test equipment to the storage device, performing a ROM initialization of the storage controller, transmitting a write command including an algorithm pattern corresponding to a designated special function register of the storage controller from the test equipment to the storage device, performing, by the storage controller, a write operation on the designated special function register based on the write command, transmitting a read command corresponding to the designated special function register from the test equipment to the storage device, receiving, by the storage controller, the read command corresponding to the designated special function register, and transmitting a chip ID response corresponding to the read command from the storage controller to the test equipment.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
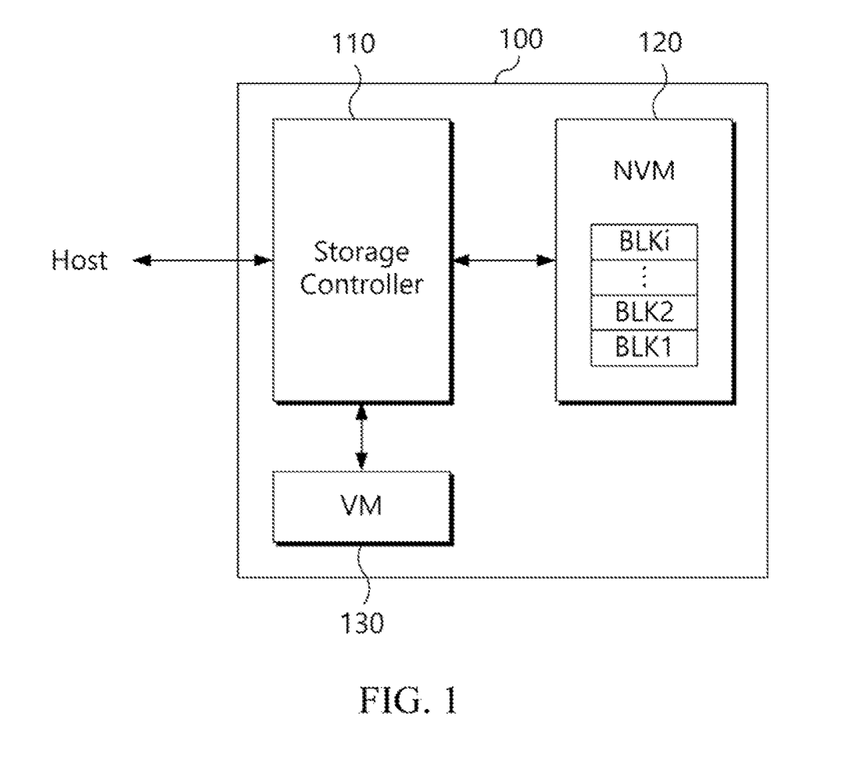
FIG. 1 is a block diagram illustrating a storage device according to an example embodiment.

FIG. 1 is a block diagram illustrating a storage device according to an example embodiment. Referring to FIG. 1, a storage device 100 may include a storage controller 110 and a nonvolatile memory device 120. The storage controller 110 and the nonvolatile memory device 120 may be implemented with one chip, one package, or one module and may be provided to a memory system such as a memory card, a memory stick, or a solid state drive (SSD).

According to an example embodiment, the storage controller 110 may be configured to control the nonvolatile memory device 120. In an implementation, in response to a request of a host, the storage controller 110 may write data to the nonvolatile memory device 120 or may read data stored in the nonvolatile memory device 120. To access the nonvolatile memory device 120, the storage controller 110 may provide a command, an address, data, and a control signal to the nonvolatile memory device 120.

In particular, the storage controller 110 may include a flash translation layer (FTL) that performs a garbage collection. The flash translation layer 112 may provide interfacing for hiding an erase operation of the nonvolatile memory device 120 between a file system of the host and the nonvolatile memory device 120. The flash translation layer may compensate for drawbacks of the nonvolatile memory device 120, such as erase-before-write and mismatch between an erase unit and a write unit. The flash translation layer may map a logical address generated by a file system of the host to a physical address of the nonvolatile memory device 120. The flash translation layer may perform wear leveling for managing a lifetime of the nonvolatile memory device 120 or garbage collection for managing a data capacity.

According to an example embodiment, under control of the storage controller 110, the nonvolatile memory device 120 may store data received from the storage controller 110 or may transmit data stored therein to the storage controller 110. The nonvolatile memory device 120 may include a plurality of memory blocks BLK1 to BLKi. Each of the plurality of memory blocks BLK1 to BLKi may have a three-dimensional memory structure in which word line layers are stacked in a direction perpendicular to a substrate. Each of the plurality of memory blocks BLK1 to BLKi may be managed by the storage controller 110 through wear leveling information such as an erase count (EC).

According to an example embodiment, a volatile memory 130 may store various information (e.g., meta data MD) necessary for the storage device 100 to operate. In an implementation, the storage controller 110 may manage data stored in the nonvolatile memory device 120 through an address translation operation. The address translation operation may refer to an operation of translating between a logical block address managed by the host and a physical block address of the nonvolatile memory device 120. The address translation operation may be performed through a mapping table. The mapping table may be stored and managed in the volatile memory 130.

Figure 2:
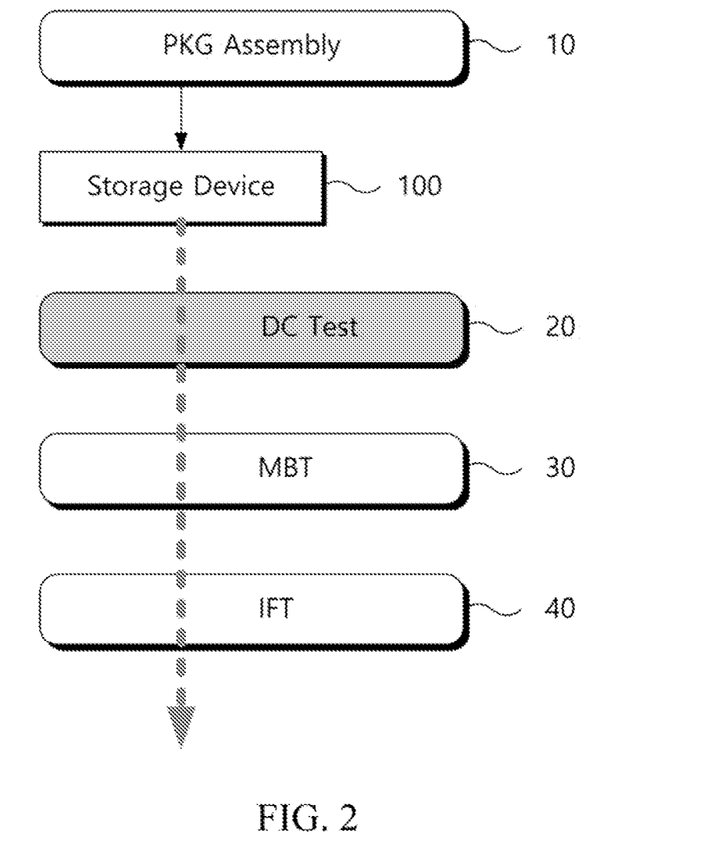
FIG. 2 is a diagram illustrating an example embodiment of a manufacture and test process of a storage device of FIG. 1.

FIG. 2 is a diagram illustrating an example embodiment of a manufacturing and testing process of a storage device of FIG. 1. Referring to FIG. 2, whether or not the storage device 100 is defective may be confirmed after being assembled through an assembly process 10, a DC test process 20, a monitoring burn-in and tester (MBT) process 30, and an IFT process 40.

According to an example embodiment, in the assembly process 10, the storage device 100 may be assembled to include the storage controller 110, the nonvolatile memory 120, and the volatile memory 130. The assembled storage device 100 may be tested through the DC test process 20, the MBT process 30, and the IFT process 40. In the DC test process 20, the nonvolatile memory 120 and the volatile memory 130 included in the storage device 100 may be tested. In the DC test process 20, defects generated in the assembly process 10 may be identified. Normally, the DC test process 20 may be performed using low-cost test equipment that does not include a vector memory. Accordingly, in the DC test process 20, the electrical characteristics of the nonvolatile memory 120 and the volatile memory 130 may be tested, and the storage controller 110 may not be tested. The MBT process 30 refers to a process in which a tester function is added to the process of applying extreme conditions. The IFT process 40 refers to a test of functional parameters of the storage device 100. The MBT process 30 and the IFT process 40 may be performed through expensive test equipment including a vector memory. In the MBT process 30 and the IFT process 40, the nonvolatile memory 120 and the volatile memory 130, as well as the storage controller 110 may be tested. In the MBT process 30 and the IFT process 40, the test equipment may load firmware into the vector memory and may test the storage controller 110 using the firmware. In this case, the firmware may transmit test data through data pads of the storage controller 110, and a test result of the storage controller 110 may also be transmitted to the test equipment through the data pads of the storage controller 110.

According to an example embodiment, a method of testing the storage controller may be directed to how to perform a test with regard to the storage controller 110 in the DC test process 20. In an implementation, in a test method of the storage controller, the storage controller 110 may be tested by using a special function register (SFR) included in the storage controller 110 and by generating an individual algorithm pattern during the DC test process 20. In the test method of the storage controller, the test may be performed using a command pad of the storage controller 110 without using a vector memory.

Figure 3:
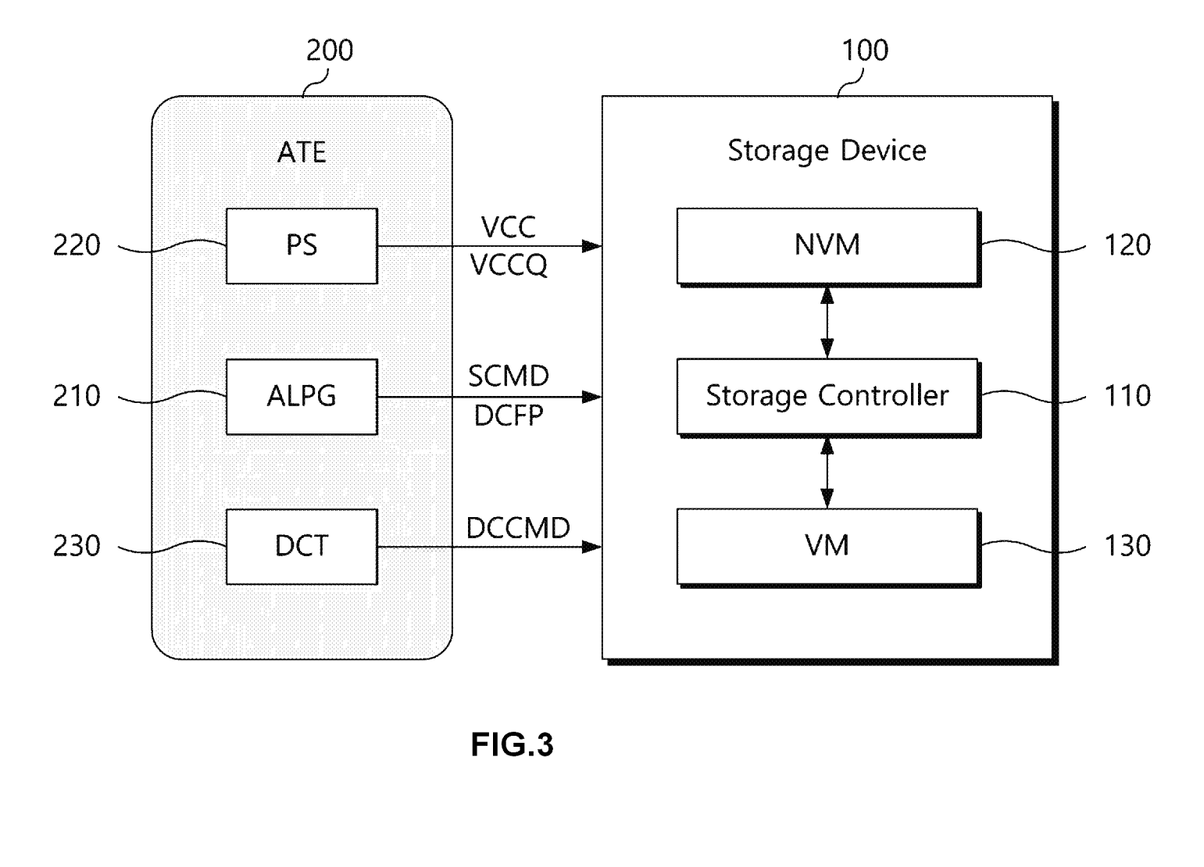
FIG. 3 is a diagram illustrating an example embodiment of an automated test equipment for testing a storage device in a DC test process of FIG. 2.

FIG. 3 is a diagram illustrating an example embodiment of an automated test equipment for testing a storage device in a DC test process of FIG. 2. Referring to FIG. 3, an automated test equipment 200 may include an algorithm pattern generator 210, a power supply 220, and an electrical characteristic tester 230.

According to an example embodiment, the automated test equipment 200 may test the storage controller 110 of the storage device 100. In an implementation, the algorithm pattern generator 210 may generate a special command SCMD and transmit it to the storage controller 110. The special command SCMD may include a specific algorithm pattern corresponding to a special function register included in the storage controller 110. The specific algorithm pattern may include contents of performing a direct access operation to a specific memory area of a special function register. The storage controller 110 may receive the special command SCMD and may selectively access special function registers corresponding to the special command SCMD. The storage controller 110 may transmit a response corresponding to the selective access of the special function register to the automated test equipment 200.

According to an example embodiment, the algorithm pattern generator 210 may transmit the special command SCMD through a command pad of the storage controller 110. In addition, the storage controller 110 may transmit the response corresponding to the special command SCMD to the automated test equipment 200 through a command pad of the storage controller 110. In an implementation, the automated test equipment 200 may not include a vector memory. Accordingly, the automated test equipment 200 may not use firmware to test the storage controller 110 and may not transmit data through the data pad of the storage controller 110. The algorithm pattern generator 210 may generate the special command SCMD (e.g., including a specific algorithm pattern) to be transmitted through a command pad of the storage controller 110 and may receive a response corresponding to the special command SCMD through the command pad of the storage controller 110 to perform a test of the storage controller 110. Therefore, the automated test equipment 200 does not need to include a vector memory, and the cost of the automated test equipment 200 may be reduced. In addition, since the capacity of data (e.g., write command or read command) transmitted through the command pad of the storage controller 110 is less than the capacity of data (e.g., test data transmitted by firmware using a vector memory) transmitted through the data pad, test time and test cost may also be reduced.

According to an example embodiment, the automated test equipment 200 may test the nonvolatile memory 120 or the volatile memory 130 of the storage device 100. In an implementation, the algorithm pattern generator 210 may generate an electrical characteristic test pattern DCFP for testing the nonvolatile memory 120 or the volatile memory 130 of the storage device 100. The electrical characteristic tester 230 may generate an electrical characteristic test command DCCMD. The automated test equipment 200 may transmit the electrical characteristic test pattern DCFP and the electrical characteristic test command DCCMD to the storage device 100. The storage device 100 may test electrical characteristics of the nonvolatile memory 120 or the volatile memory 130 based on the electrical characteristic test pattern DCFP. The storage device 100 may transmit a test result corresponding to the electrical characteristic test pattern DCFP to the automated test equipment 200 based on the electrical characteristic test command DCCMD.

According to an example embodiment, the automated test equipment 200 may supply power to the storage device 100 when the storage device 100 is tested. In an implementation, the power supply 220 may supply a first power supply voltage VCCQ and a second power supply voltage VCC. In an implementation, the first power supply voltage VCCQ may be supplied to the storage controller 110. The second power supply voltage VCC may be supplied to the nonvolatile memory 120 or the volatile memory 130. The power supply 220 may selectively supply the first power supply voltage VCCQ and the second power supply voltage VCC depending on a test area.

Figure 4:
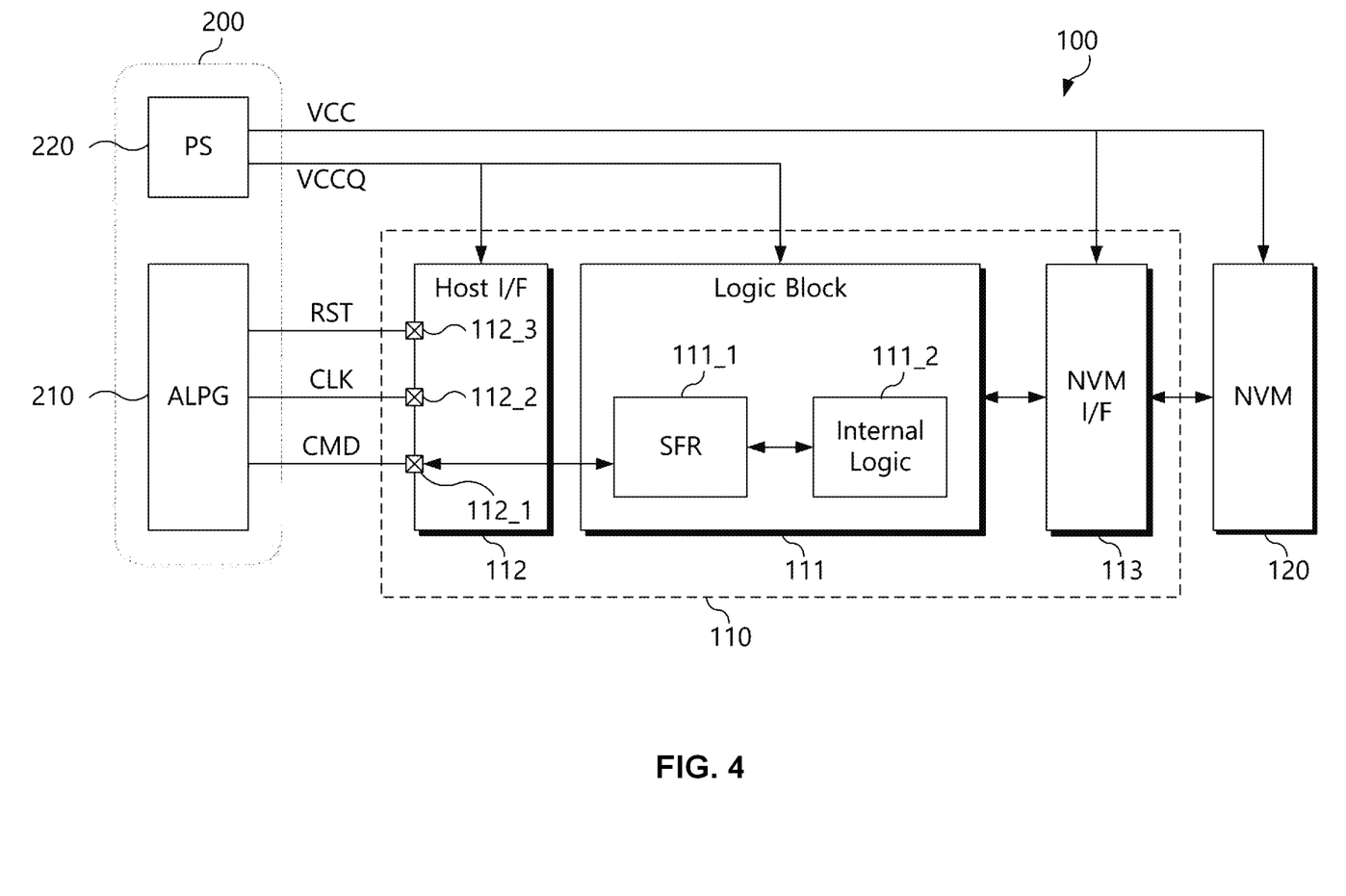
FIG. 4 is a block diagram illustrating an example embodiment of a method of testing a storage controller of a storage device by an automated test equipment of FIG. 3.

FIG. 4 is a block diagram illustrating an example embodiment of a method of testing a storage controller of a storage device by an automated test equipment of FIG. 3. Referring to FIG. 4, the automated test equipment 200 may supply power to the storage device 100 and may test the storage controller 110. The storage controller 110 may include a logic block 111, a host interface 112, and a nonvolatile memory interface 113.

According to an embodiment, the logic block 111 may include a special function register 111_1 and an internal logic 111_2. In an implementation, the special function register 111_1 may be configured to store data for performing a specific function of the logic block 111. In an implementation, the special function register 111_1 may be used as an I/O control register, a timer, a stack pointer, a program counter, a return address register, a status register, and a condition code register. The internal logic 111_2 is logic for processing data inside the logic block 111 and may be configured to process multiple tasks using data stored in the special function register 111_1.

According to one embodiment, the host interface 112 may connect a host to the logic block 111. In an implementation, the host interface 112 may transmit and receive packets to and from the host. A packet transmitted from the host to the host interface 112 may include a command or data to be written to the nonvolatile memory 120. In addition, a packet transmitted from the host interface 112 to the host may include a response to a command or data read from the nonvolatile memory 120.

According to an example embodiment, when the automated test equipment 200 is connected to the storage device 100, the automated test equipment 200 may be connected to the logic block 111 through the host interface 112. In an implementation, the host interface 112 may include various contact pads. In an implementation, the contact pad may include a command pad 112_1, a clock pad 112_2, or a reset pad 112_3. The host interface 112 may include at least one contact pad. The algorithm pattern generator 210 may transmit a command signal CMD through the command pad 112_1. The command signal CMD may include the special command SCMD of FIG. 3. The algorithm pattern generator 210 may transmit a clock signal CLK through the clock pad 112_2. The algorithm pattern generator 210 may transmit a reset signal RST through the reset pad 112_3.

According to an example embodiment, the algorithm pattern generator 210 may transmit the special command SCMD including an algorithm pattern for testing the storage controller 110 to the storage controller 110. In an implementation, the special command SCMD may be transmitted to the corresponding special function register 111_1 through the command pad 112_1 of the host interface 112. The internal logic 111_2 may perform a specific operation based on the special command SCMD. The special function register 111_1 may transmit feedback data with regard to an operation of the internal logic 111_2 performed based on the special command SCMD to the algorithm pattern generator 210 through the command pad 112_1.

According to an example embodiment, the power supply 220 may supply power to the storage device 100 while the storage controller 110 is being tested. In an implementation, the power supply 220 may supply the first power supply voltage VCCQ to the logic block 111 and the host interface 112. The power supply 220 may supply the second power supply voltage VCC to the nonvolatile memory interface 113 and the nonvolatile memory 120.

According to an example embodiment, the storage controller 110 may be connected to the nonvolatile memory 120 through the nonvolatile memory interface 113. In an implementation, the nonvolatile memory interface 113 may transmit data to be written in the nonvolatile memory 120 to the nonvolatile memory 120 or may receive data read from the nonvolatile memory 120. The nonvolatile memory interface 113 may be implemented to comply with standard protocols such as a Toggle or an Open NAND Flash Interface (ONFI).

Figure 5:
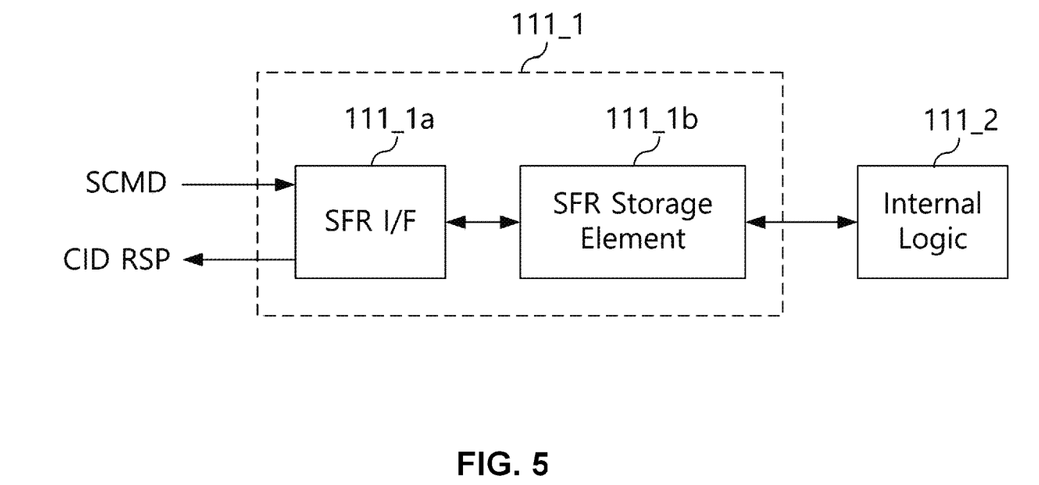
FIG. 5 is a diagram illustrating an example embodiment of a special function register of FIG. 4.

FIG. 5 is a diagram illustrating an example embodiment of a special function register of FIG. 4. Referring to FIGS. 4 and 5, the special function register 111_1 may include a special function register interface 111_1a and a special function register storage element 111_1b.

According to an example embodiment, the special function register interface 111_1a may be configured to interface between the host interface 112 and the special function register storage element 111_1b. In an implementation, the special function register interface 111_1a may transfer data included in the special command SCMD to the special function register storage element 111_1b, and may transfer a chip ID response CID RSP read from the special function register storage element 111_1b to the host interface 112.

According to an example embodiment, the special function register storage element 111_1b may store data included in the special command SCMD. In an implementation, the special function register storage element 111_1b may transfer data corresponding to the special command SCMD to the internal logic 111_2 based on the special command SCMD (e.g., a write command). Also, the special function register storage element 111_1b may store data updated by the internal logic 111_2. The special function register storage element 111_1b may output data updated by the internal logic 111_2 based on the special command SCMD (e.g., a read command).

Figure 6:
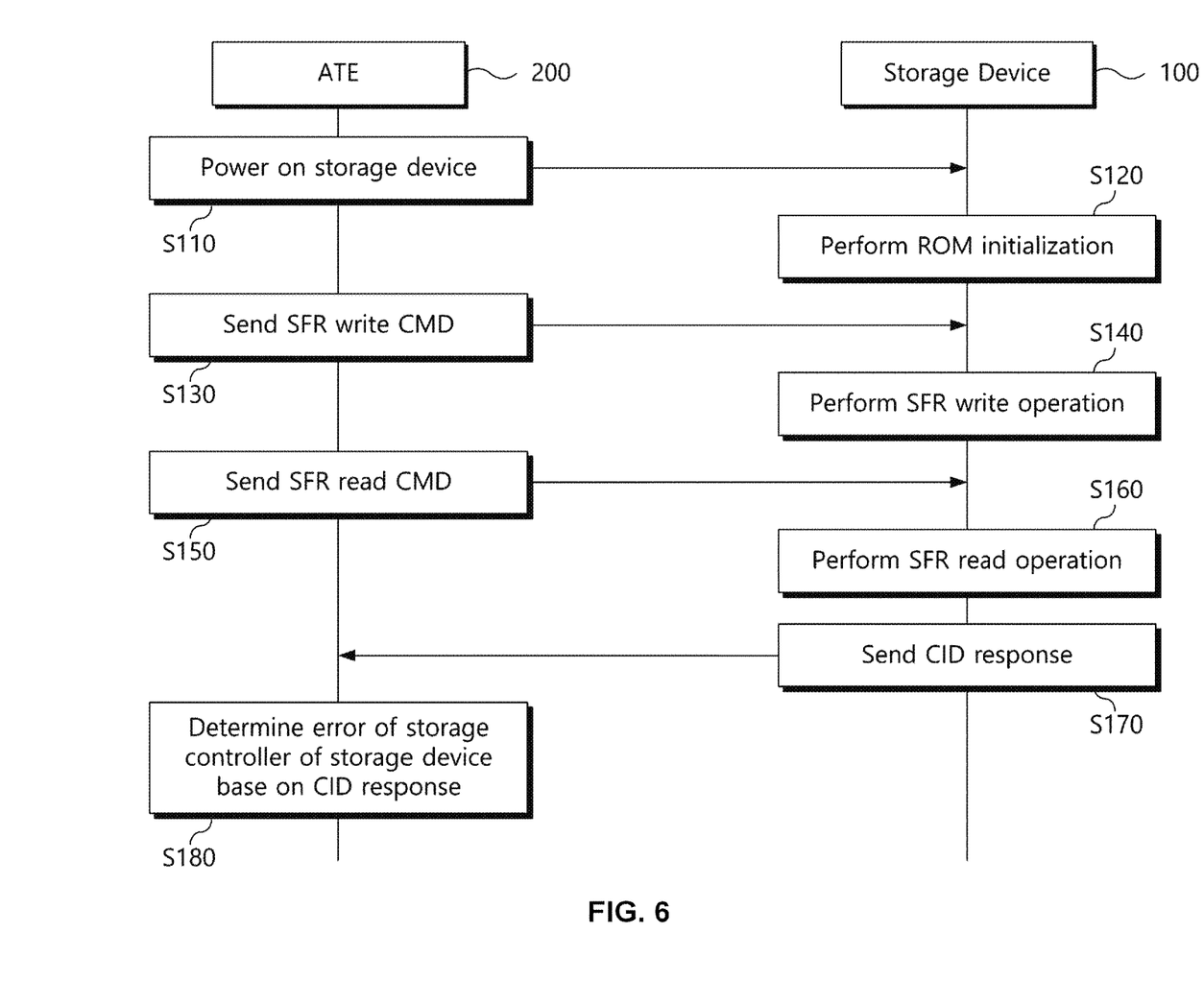
FIG. 6 is a flowchart illustrating a test method of a storage controller, according to an example embodiment.

FIG. 6 is a flowchart illustrating a test method of a storage controller, according to an example embodiment. Referring to FIGS. 4 to 6, the automated test equipment 200 may test the storage controller 110 of the storage device 100 by using the special command SCMD without a vector memory.

According to an example embodiment, in operation S110, the automated test equipment 200 may supply power to the storage device 100. In an implementation, the power supply 220 of the automated test equipment 200 may supply power to the storage device 100 while the storage controller 110 is being tested. The power supply 220 may supply the first power supply voltage VCCQ to the logic block 111 and the host interface 112. The power supply 220 may supply the second power supply voltage VCC to the nonvolatile memory interface 113 and the nonvolatile memory 120.

According to an example embodiment, in operation S120, the storage device 100 to which power is supplied may perform a ROM initialization operation. In an implementation, the storage device 100 may set the storage controller 110 and the nonvolatile memory 120 to an operable basic state based on data stored in a ROM. In this case, the automated test equipment 200 may transmit a command necessary for a ROM initialization to the storage device 100. The ROM initialization operation may include a process of recognizing device characteristics such as a device type, operating performance, and line connection of the counterpart device (e.g., the automated test equipment 200 or a host). After the ROM initialization operation, the storage controller 110 may stably exchange signals with the automated test equipment 200 through the command pad 112_1, the clock pad 112_2, or the reset pad 112_3.

According to an example embodiment, in operation S130, the automated test equipment 200 may transmit a write command with regard to a designated special function register to the storage device 100. In an implementation, the algorithm pattern generator 210 may transmit a write command including an algorithm pattern for testing the storage controller 110 to the storage controller 110. The write command may be transmitted to a corresponding designated special function register (e.g., the special function register 111_1) through the command pad 112_1 of the host interface 112. The designated special function registers may be selected in advance from all special function registers. As an example, the designated special function register 111_1 may be used as an I/O control register, a timer, a stack pointer, a program counter, a return address register, a status register, and a condition code register. The designated special function registers may be selected as registers necessary for error determination of the storage controller 110.

According to an example embodiment, in operation S140, the storage device 100 may perform a write operation on a designated special function register based on the write command. In an implementation, an access operation with regard to the designated special function register may be composed of a combination of prearranged test signals. The internal logic 111_2 may perform a specific operation based on a write command. The special function register 111_1 may be updated by feedback data with regard to an operation of the internal logic 111_2 performed based on a write command.

According to an example embodiment, in operation S150, the automated test equipment 200 may transmit a read command with regard to a designated special function register to the storage device 100. In an implementation, the automated test equipment 200 may transmit a read command with respect to a designated special function register corresponding to the write command transmitted in operation S130.

According to an example embodiment, in operation S160, the storage device 100 may perform a read operation on a designated special function register based on the read command. In an implementation, the storage controller 110 may read feedback data updated in a designated special function register by an operation of the internal logic 111_2 performed based on the write command transmitted in operation S130.

According to an example embodiment, in operation S170, the storage device 100 may transmit the chip ID response CID RSP corresponding to a designated special function register to the automated test equipment 200. In an implementation, the storage controller 110 may transmit the chip ID response CID RSP updated in a designated special function register to the algorithm pattern generator 210 through the command pad 112_1 based on the read command.

According to an example embodiment, in operation S180, the automated test equipment 200 may determine an error of the storage controller 110 of the storage device 100 based on the received chip ID response CID RSP. In an implementation, the algorithm pattern generator 210 may compare result data expected for a write command with the chip ID response CID RSP. In an implementation, result data expected for the write command may refer to data expected to be output when the write command is input when the storage controller 110 normally operates. The algorithm pattern generator 210 may determine that the storage controller 110 is normal when the expected result data for the write command and the chip ID response CID RSP are the same. The algorithm pattern generator 210 may determine that the storage controller 110 is defective when the expected result data for the write command and the chip ID response CID RSP are different.

Figure 7:
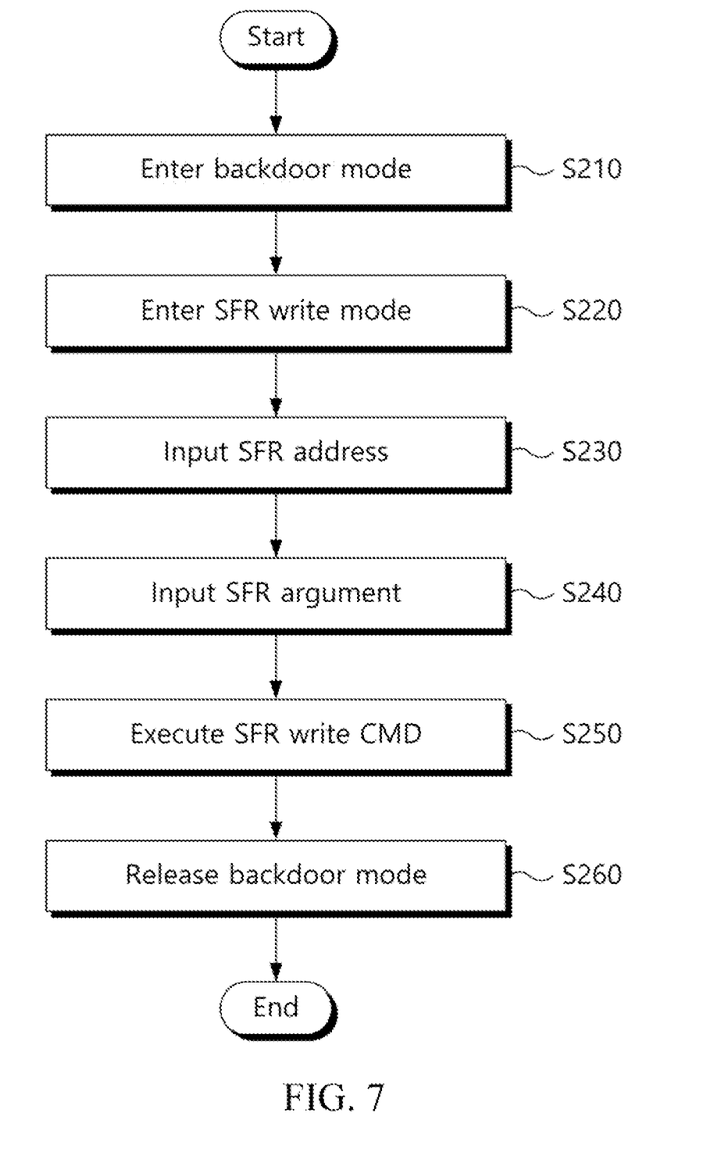
FIG. 7 is a flowchart illustrating an example embodiment of a write operation with respect to a special function register of FIG. 6.

FIG. 7 is a flowchart illustrating an example embodiment of a write operation with respect to a special function register of FIG. 6. Referring to FIG. 7, the storage controller 110 may enter a backdoor mode when a write command with regard to a designated special function register is received (operation S210). After entering the backdoor mode, the storage controller 110 may enter the write mode of the special function register based on the write command (operation S220). The storage controller 110 may input an address of the special function register based on the write command (operation S230). The storage controller 110 may input an argument into the special function register based on the write command (operation S240). The storage controller 110 may execute a write operation with respect to a designated special function register (e.g., a register corresponding to the address of operation S230) based on the argument of operation S240 (operation S250). In an implementation, in operation S250, the designated special function register may be updated by the feedback data with regard to the operation of the internal logic 111_2. After the write operation is completed, the storage controller 110 may release the backdoor mode (operation S260).

Figure 8:
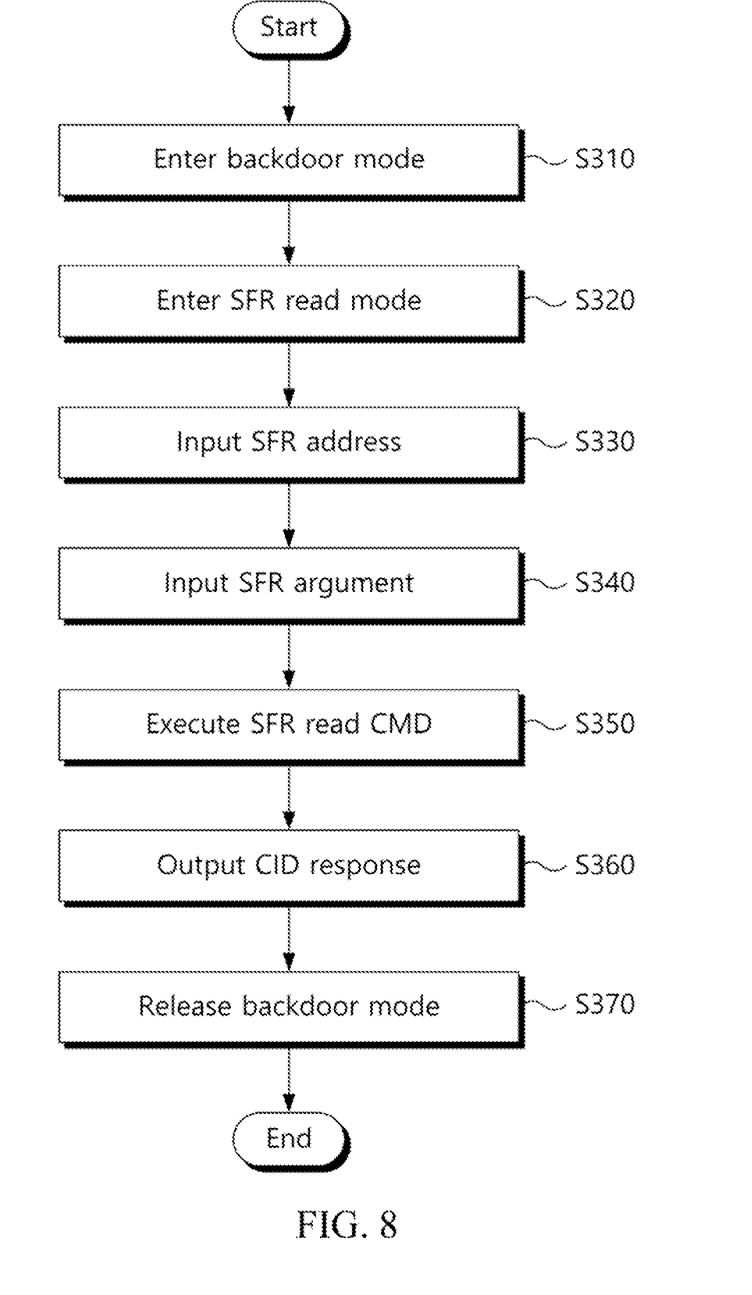
FIG. 8 is a flowchart illustrating an example embodiment of a read operation with respect to a special function register of FIG. 6.

FIG. 8 is a flowchart illustrating an example embodiment of a read operation with respect to a special function register of FIG. 6. Referring to FIG. 8, the storage controller 110 may enter a backdoor mode when a read command with regard to a designated special function register is received (operation S310). After entering the backdoor mode, the storage controller 110 may enter the read mode of the special function register based on the read command (operation S320). The storage controller 110 may input an address of the special function register based on the read command (operation S330). The storage controller 110 may input an argument into the special function register based on the read command (operation S340). In an implementation, the argument may be a read argument. The storage controller 110 may execute the read operation with respect to the designated special function register (operation S350). In this case, the storage controller 110 may read updated feedback data in the designated special function register. The updated feedback data may include the chip ID response CID RSP. The storage controller 110 may output the updated chip ID response CID RSP from the designated special function register through the command pad 112_1 (operation S360). After the read operation is completed, the storage controller 110 may release the backdoor mode (operation S370).

According to an example embodiment, the storage controller 110 may simultaneously perform the write operation of FIG. 7 and the read operation of FIG. 8 as a pair. Alternatively, the storage controller 110 may repeat the write operation of FIG. 7 multiple times based on a plurality of write commands to update a plurality of designated special function registers, and then may repeat the read operation of FIG. 8 multiple times based on a plurality of read commands to output the updated feedback data (e.g. the chip ID response CID RSP) from the plurality of designated special function registers.

Figure 9:
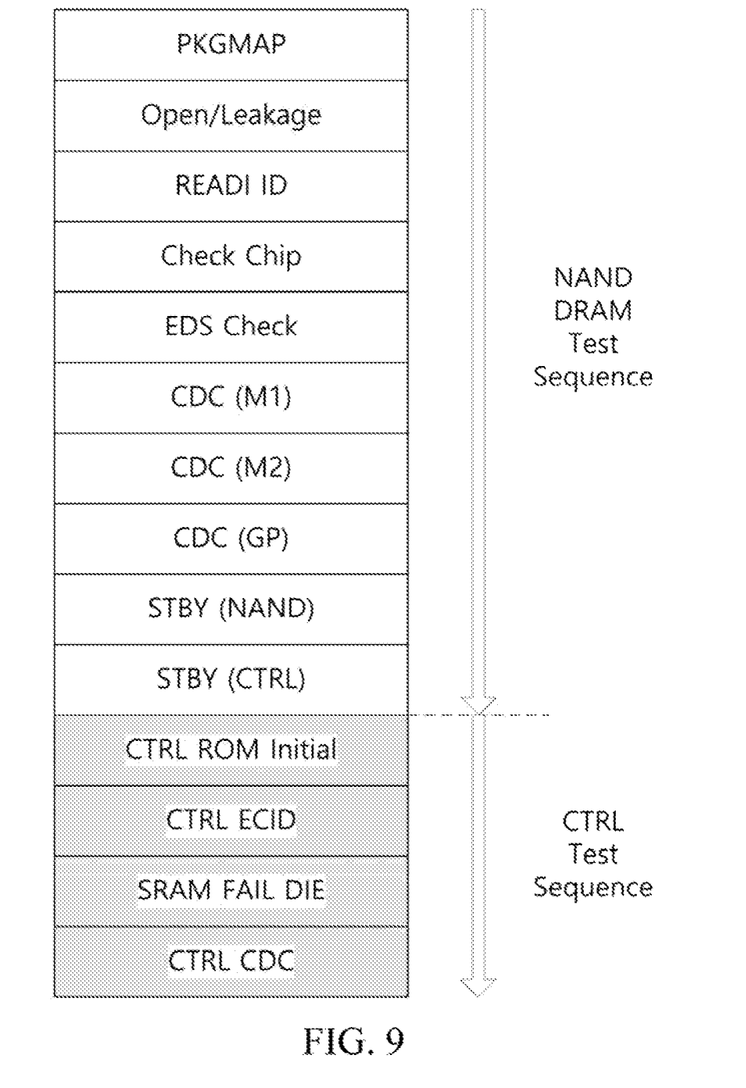
FIG. 9 is a diagram illustrating an example embodiment of a test operation of a storage device performed by an automated test equipment of FIG. 3.

FIG. 9 is a diagram illustrating an example embodiment of a test operation of a storage device performed by an automated test equipment of FIG. 3. Referring to FIG. 9, the automated test equipment 200 of FIG. 3 may perform a DC test (e.g. a NAND and DRAM test sequence) with respect to the nonvolatile memory 120 (e.g., a NAND flash memory) and the volatile memory 130 (e.g., a DRAM) of the storage device 100. In addition, the automated test equipment 200 may test the storage controller 110 of the storage device 100 (e.g., a CTRL test sequence). The automated test equipment 200 may perform test of the storage controller 110 without a vector memory. The automated test equipment 200 may transmit a special command corresponding to a designated special function register through the command pad of the storage controller 110 and may determine whether the storage controller 110 is defective based on the chip ID response with regard to the special command. Accordingly, the automated test equipment 200 may perform the test of the storage controller 110 at a reduced cost. In addition, since the capacity of data (e.g., write command or read command) transmitted through the command pad of the storage controller 110 is less than the capacity of data (e.g., test data transmitted by firmware using a vector memory) transmitted through the data pad, test time and test cost may also be reduced.

By way of summary and review, a storage device that is a nonvolatile storage medium may retain data permanently or semi-permanently regardless of whether power is supplied thereto. The storage device may include both a nonvolatile semiconductor memory and a volatile semiconductor memory that is smaller in capacity than the nonvolatile semiconductor memory but has a fast input/output speed. In an implementation, the storage device may use the volatile semiconductor memory as a cache memory with regard to the nonvolatile semiconductor memory.

The storage devices may be sold through various manufacturing processes. The storage devices may be classified as defective products through various tests during the manufacturing processes. During a test process of the storage devices, a controller, a nonvolatile semiconductor memory device, or a volatile semiconductor memory device may be tested.

The test equipment cost may be reduced by testing the storage controller of the storage device through a test equipment not including a vector memory. The method for testing a storage controller of a storage device using a test equipment may not include a vector memory.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of testing a storage controller included in a storage device, the method comprising:
supplying power to the storage device;
transmitting to a designated special function register of the storage controller a write command including an algorithm pattern corresponding to the designated special function register of the storage controller;
transmitting a read command corresponding to the designated special function register, to read data stored in the designated special function register as a result of the write command including the algorithm pattern;
receiving a chip ID response corresponding to the read command and the read data; and
determining whether the storage controller is defective based on the chip ID response.

2. The method as claimed in claim 1, wherein the write command, the read command, and the chip ID response are transmitted through a command pad of the storage controller.

3. The method as claimed in claim 1, wherein the determining of whether the storage controller is defective includes:
comparing expected result data with respect to the write command with the chip ID response;
determining that the storage controller is normal when the expected result data and the chip ID response are the same; and
determining that the storage controller is defective when the expected result data and the chip ID response are different.

4. The method as claimed in claim 1, wherein the write command includes a combination of prearranged test signals that access the designated special function register.

5. The method as claimed in claim 1, wherein the designated special function register includes only a selected part of all special function registers included in the storage controller.

6. A method of testing a storage controller included in a storage device, the method comprising:
receiving power from a test equipment;
performing a ROM initialization;
receiving a write command including an algorithm pattern corresponding to a designated special function register of the storage controller;
performing a write operation on the designated special function register based on the write command;
receiving a read command corresponding to the designated special function register;
performing a read operation on the designated special function register based on the read command, to read data stored in the designated special function register as a result of the write command including the algorithm pattern; and
transmitting a chip ID response corresponding to the read command and the read data.

7. The method as claimed in claim 6, wherein the steps of receiving a write command, performing a write operation, receiving a read command, performing a read operation, and transmitting the chip ID are performed without the use of a vector memory.

8. The method as claimed in claim 6, wherein the performing of the write operation includes:
   entering a backdoor mode based on the write command;
   entering a write mode based on the write command;
   inputting an address of the designated special function register;
   inputting a write argument to the designated special function register;
   executing the write command with respect to internal logic corresponding to the designated special function register; and
   releasing the backdoor mode.

9. The method as claimed in claim 8, wherein the executing of the write command includes updating the designated special function register by executing the write argument in the internal logic.

10. The method as claimed in claim 6, wherein the performing of the read operation includes:
    entering a backdoor mode based on the read command;
    entering a read mode based on the read command;
    inputting an address of the designated special function register;
    inputting a read argument to the designated special function register;
    executing the read command with respect to internal logic corresponding to the designated special function register;
    outputting the chip ID response corresponding to the read command; and
    releasing the backdoor mode.

11. The method as claimed in claim 10, wherein the outputting the chip ID response includes outputting feedback data updated in the designated special function register by the write command.

12. A method of testing a storage controller included in a storage device, the method comprising:
    supplying power from test equipment to the storage device;
    performing a ROM initialization of the storage controller;
    transmitting a write command including an algorithm pattern corresponding to a designated special function register of the storage controller from the test equipment to the storage device;
    performing, by the storage controller, a write operation on the designated special function register based on the write command;
    transmitting a read command corresponding to the designated special function register from the test equipment to the storage device;
    receiving, by the storage controller, the read command corresponding to the designated special function register, and in response to the received read command, reading data written to the storage controller as a result of the write operation; and
    transmitting a chip ID response corresponding to the read command and the read data from the storage controller to the test equipment.

13. The method as claimed in claim 12, further comprising:
    determining whether the storage controller is defective based on the chip ID response.

14. The method as claimed in claim 13, wherein the determining of whether the storage controller is defective includes:
    comparing expected result data based on test data included in the write command with the chip ID response;
    determining that the storage controller is normal when the expected result data and the chip ID response are the same; and
    determining that the storage controller is defective when the expected result data and the chip ID response are different.

15. The method as claimed in claim 12, wherein the write command, the read command, and the chip ID response are transmitted through a command pad of the storage controller.

16. The method as claimed in claim 12, wherein the performing of the write operation includes:
    entering a backdoor mode based on the write command;
    inputting an address of the designated special function register;
    inputting a write argument to the designated special function register;
    executing the write command with respect to internal logic corresponding to the designated special function register; and
    releasing the backdoor mode.

17. The method as claimed in claim 16, wherein the executing of the write command includes updating the designated special function register by executing the write argument in the internal logic.

18. The method as claimed in claim 12, further comprising performing a read operation including:
    entering a backdoor mode based on the read command;
    entering a read mode based on the read command;
    inputting an address of the designated special function register;
    inputting a read argument to the designated special function register;
    executing the read command with respect to internal logic corresponding to the designated special function register;
    outputting the chip ID response corresponding to the read command; and
    releasing the backdoor mode.

19. The method as claimed in claim 18, wherein the outputting the chip ID response includes outputting feedback data updated in the designated special function register by the write command.

20. The method as claimed in claim 12, wherein the steps of receiving a write command, performing a write operation, receiving a read command, performing a read operation, and transmitting the chip ID are performed without the use of a vector memory.

* * * * *